United States Patent
Ito (10) Patent No.: US 8,559,042 B2
(45) Date of Patent: Oct. 15, 2013

(54) IMAGE FORMING APPARATUS, CONTROLLING METHOD FOR SAME, AND STORAGE MEDIUM

(75) Inventor: Koichi Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 49 days.

(21) Appl. No.: 13/312,337

(22) Filed: Dec. 6, 2011

(65) Prior Publication Data
US 2012/0162706 A1 Jun. 28, 2012

(30) Foreign Application Priority Data
Dec. 27, 2010 (JP) .................. 2010-289843

(51) Int. Cl.
*G06F 15/00* (2006.01)
*G06K 1/00* (2006.01)

(52) U.S. Cl.
USPC .......... 358/1.15; 358/1.1; 358/1.11; 358/1.12

(58) Field of Classification Search
None
See application file for complete search history.

(56) References Cited

U.S. PATENT DOCUMENTS 7,142,317 B2 11/2006 Naito
7,196,811 B2 3/2007 Naito

FOREIGN PATENT DOCUMENTS

JP 2006-297739 11/2006

*Primary Examiner* — Thierry Pham
(74) *Attorney, Agent, or Firm* — Fitzpatrick, Cella, Harper & Scinto (57) ABSTRACT

A main body controller provided in an image forming apparatus receives a VDP job from an external computer, and arranges image data of a reusable object and a variable object, which correspond to the VDP job, on a page for printout. An inspection controller performs inspection processing for printed matter for each page, and the main body controller preferentially stores image data of the reusable object, which corresponds to the page for which the printing has been determined to be defective as a result of inspection processing, in a cache unit. The main body controller acquires the reusable object, which corresponds to the page for which the printing has been determined to be defective, from the cache unit, and executes page reprint processing using the acquired reusable object.

6 Claims, 9 Drawing Sheets

IMAGE FORMING APPARATUS, CONTROLLING METHOD FOR SAME, AND STORAGE MEDIUM

BACKGROUND OF THE INVENTION

1. Field of the Invention

The present invention relates to an image forming apparatus, a controlling method for the same, and a storage medium.

2. Description of the Related Art

The publication of printed matter in the commercial printing industry includes various steps such as sending of a manuscript, design or layout, overall layout (presentation by a printer output), proofreading (layout correction, color correction), proof sheet printing, block copy formation, printing, post-processing, and shipping. The commercial printing industry executes the aforementioned steps using a large-scale printing apparatus or the like, such as an offset photoengraving printer or the like. Among the aforementioned steps, the block copy formation is important. However, once the block copy has been formed, its correction is not easy, and thus, it is fairly disadvantageous in terms of costs. Thus, careful proofreading (a check of the layout and a color confirming operation) is indispensable, and it also takes a certain amount of time to make printed matter.

On the other hand, in recent years, the realization of a high speed and high quality picture by an electrophotographic-type image forming apparatus or an ink jet-type image forming apparatus has been progressing. Hence, in opposition to such a commercial printing industry, a market called a Print On Demand (hereinbelow, abbreviated as "POD") is growing. In the POD market, it is intended that a job of a relatively smaller lot than a job which is handled by a printing apparatus can be handled in a tight delivery date without using a large-scaled apparatus.

In the POD market, digital print using electronic data is realized by the use of digital image forming apparatuses such as digital copiers or digital multi-function peripherals. By doing so, the POD market is trying to come close to a printing industry level to some extent utilizing a computer. Among them, there has been an increase in demand of variable printing (Variable Data Printing) for printing data in response to each customer need. A variable printing job (VDP job) prints customer data corresponding to one VDP job for each record unit. Thus, one VDP job includes a large amount of records (e.g., tens of thousands of records).

Each record included in a VDP job includes a variable object serving as variable data and a reusable object that is shared among a plurality of pages. An image forming apparatus acquires an object(s) included in a VDP job and performs rendering processing to thereby generate a bitmap image. When the rendering processed object is a reusable object, the image forming apparatus stores a rendering processed reusable object in a predetermined cache region. Then, the image forming apparatus arranges the rendering processed variable object and reusable object on each page included in a VDP job for printout.

Here, when a reusable object is stored in a cache region, the image forming apparatus reads out the reusable object from the cache region, and arranges the readout reusable object on a page together with the variable object. On the other hand, when the reusable object is not held in the cache region, the image forming apparatus performs new rendering processing for the reusable object, and arranges the rendering processed reusable object on a page. In other words, in this case, the image forming apparatus generates the bitmap image (image data) of the reusable object as so-called "image data of a variable object".

As a technology for inspecting printed matter in the commercial printing industry or the POD market, Japanese Patent Laid-Open No. 2006-297739 discloses a print system that acquires an image by imaging printed matter and extracts a defective page based on the comparison result between the acquired image and the image for inspection.

However, if there is no room in the cache region provided by the image forming apparatus and the image forming apparatus reprints a defective page, the following problems may occur. When the image forming apparatus reprints a defective page and a reusable object included in the defective page is not held in the cache region, the image forming apparatus must perform rendering processing for the reusable object again. When the reusable object is subject to rendering processing again, such processing takes tens of times more than the case where the rendering processed reusable object is read out from the cache region so as to be used for printing. Consequently, the efficiency of reprint processing for a defective page(s) decreases.

SUMMARY OF THE INVENTION

The image forming apparatus of the present invention increases the efficiency of reprint processing for a defective page(s) that has occurred during execution of variable printing.

According to an aspect of the present invention, an image forming apparatus that executes a print job including a first object which is shared among a plurality of pages and a second object which is variable for each page is provided that includes an object storage unit configured to store a predetermined number of image data of the first object; a job reception unit configured to receive the print job; a printing unit configured to arrange and print image data of the first and the second objects on a page; a reading unit configured to read an image of printed matter obtained by the printing; a determination unit configured to determine whether or not the printing is defective for each page based on a comparison result between an image of the read printed matter and a reference image; and a control unit configured to execute control for preferentially storing image data of the first object corresponding to a page, for which the printing has been determined to be defective, based on a determination result indicating whether or not the printing is defective by the determination unit. The printing unit acquires image data of the first object from the object storage unit and arranges the image data on the page when the object storage unit stores image data of the first object included in the received print job, and generates image data of the first object and arranges the image data on the page when the object storage unit does not store image data of the first object included in the received print job.

Further features of the present invention will become apparent from the following description of exemplary embodiments with reference to the attached drawings.

DESCRIPTION OF THE EMBODIMENTS

Figure 1:
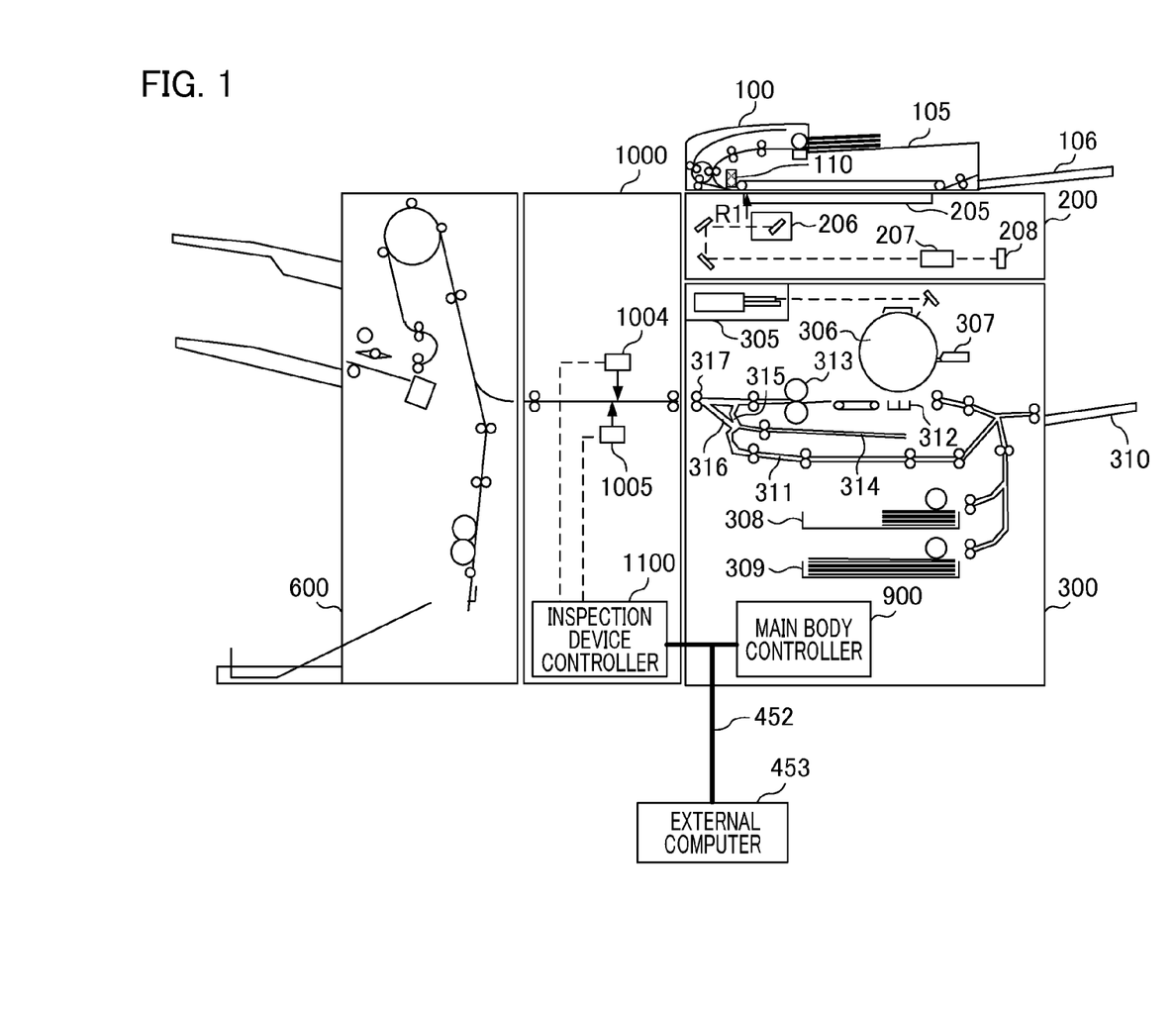
FIG. 1 is a diagram illustrating an example of the configuration of the image forming apparatus of the present embodiment.

FIG. 1 is a diagram illustrating an example of the configuration of the image forming apparatus of the present embodiment. The image forming apparatus shown in FIG. 1 includes an original sheet feeding deice 100, an image reader 200, a printer unit 300, and a main body controller 900. A method for controlling the image forming apparatus of the present embodiment and a computer program may be realized by the functions of the processing units provided in the image forming apparatus.

The original sheet feeding deice 100 performs the following processing in accordance with an instruction given by the main body controller 900. The original sheet feeding deice 100 feeds original sheets set on an original sheet tray 105 one by one in the order from a leading page, and transports the original sheets one by one on an original sheet plate glass 205 via a curved path.

The image reader 200 performs the following processing in accordance with an instruction given by the main body controller 900. The image reader 200 reads a one-sided original sheet using a readout method corresponding to a predetermined readout mode (e.g., original sheet fixation readout mode or original sheet flow readout mode). The term "original sheet fixation readout mode" refers to a readout mode in which the trailing end of an original sheet is transported and stopped at the readout position R1 on the original sheet plate glass 205 and a scanner unit 206 is then moved from left to right to thereby read the original sheet. The term "original sheet flow readout mode" refers to a readout mode in which an original sheet is transported to the readout position R1 at a predetermined readout speed to thereby read the original sheet while fixing the scanner unit 206 at the readout position R1. The original sheet feeding deice 100 discharges the read original sheet to a paper-discharging tray 106.

Also, the image reader 200 reads a double-sided original sheet using the following method. The image reader 200 reads the front side of the double-sided original sheet using the scanner unit 206, and reads the backside thereof using an optical unit 110. An image sensor (not shown), a light source, and the like are arranged within the optical unit 110. The image of the original sheet read by an image sensor 208 via a lens 207 is subject to image processing and stored in a hard disk.

Next, a description will be given of the printer unit 300. The printer unit 300 executes print processing in the following manner in accordance with an instruction given by the main body controller 900. Firstly, a printer control unit 301 (see FIG. 2) of the main body controller 900 passes an image signal, which corresponds to image data stored in a document management unit 454, to the printer unit 300 to instruct it to perform print processing for image data. As is described below, image data stored in the document management unit 454 is image data that is obtained by expanding an object(s) included in a VDP job by the main body controller 900. An exposure control unit 305 provided in the printer unit 300 outputs laser light depending on the image signal received from the printer control unit 301. When laser light is irradiated onto a photosensitive drum 306, an electrostatic latent image is formed on the photosensitive drum 306. A developer 307 develops an electrostatic latent image on the photosensitive drum 306. A transfer unit 312 transfers a developer on the photosensitive drum 306 to a sheet that has been fed from any one of cassettes 308 and 309, a manual feed unit 310, or a double-side transport path 311.

When a sheet on which a developer has been transferred is guided to a fixation unit 313, the fixation unit 313 performs developer fixation processing. The printer control unit 301 (see FIG. 2) temporarily guides a sheet, which has been subject to fixation processing by the fixation unit 313, from a path 315 to a path 314 using a flapper (not shown). After the trailing end of a sheet is fed through the path 315, the printer control unit 301 switchbacks the sheet and guides the sheet from a path 316 to a discharging roller 317. With this arrangement, a sheet may be discharged from the printer unit 300 using the discharging roller 317 with the sheet face on which the developer has been transferred being in the downward directed state (face-down). This is what is referred to as "inverted sheet discharge".

When a hard sheet such as an OHP sheet or the like guided from the manual feed unit 310 is subject to image formation, the printer control unit 301 discharges the sheet from the discharging roller 317 with the sheet face on which the developer has been transferred being in the upward directed state (face-up) without being guided to the path 315. Also, when both sides of a sheet are subject to image formation, the printer control unit 301 guides the sheet from the fixation unit 313 through the path 315 to the path 314. The printer control unit 301 switchbacks the sheet immediately after the trailing end of the sheet has passed through the path 315. Then, the printer control unit 301 guides the sheet to the double-side transport path 311 using a flapper (not shown). The transfer unit 312 transfers an electrostatic latent image again to the sheet guided to the double-side transport path 311, and the fixation unit 313 performs fixation processing.

In this manner, the division of a path length, a roller arrangement, and a drive system is made such that a sheet(s) is capable of being transported even if five half-size sheets such as A4, B5, or the like are entrapped in the course of path starting from the transfer unit 312 through the double-side transport path 311 to again return to the transfer unit 312. Since the order of discharging pages through these processes is made such that odd-numbered pages are discharged in the downward directed state, the page order may be set in order upon double-sided copying. The printer unit 300 may also execute print processing for the image of an original sheet(s) stored in a hard disk, i.e., the image read by the image reader 200, in accordance with the instruction given by the main body controller 900. During print processing, the exposure control unit 305 outputs laser light that corresponds to the signal (image signal) of the image of an original sheet stored in a hard disk.

An external computer 453 transmits a VDP job to the main body controller via an external bus 452. A VDP job is a print job including a reusable object and a variable object. A reusable object is an object (first object) that is shared among a plurality of pages. A variable object is an object (second object) that is variable for each page.

The main body controller 900 receives a VDP job transmitted from the external computer 453, and generates image data to be printed by expanding an object(s) included in the VDP job. The main body controller 900 stores the generated image data to be printed in the document management unit 454 (see FIG. 2). Then, the printer control unit 301 of the main body controller 900 passes the image signal, which corresponds to the image data stored in the document management unit 454, to the printer unit 300, and instructs it to perform print processing for the image data. With this arrangement, variable printing is executed.

The print output discharged from the discharging roller 317 is fed into an inspection device 1000. The inspection device 1000 executes inspection processing for the print output. The inspection device 1000 includes an inspection device controller 1100, a reader unit 1004, and a sheet mark reading unit 1005. The inspection device controller 1100 control the inspection device 1000 overall. The reader unit 1004 functions as a reading unit that reads the image of a print output obtained by printing. The sheet mark reading unit 1005 reads the sheet mark of the printed matter. During inspection processing of the present embodiment, image data read by the reader unit 1004 is referred to as "target image data".

Figure 2:
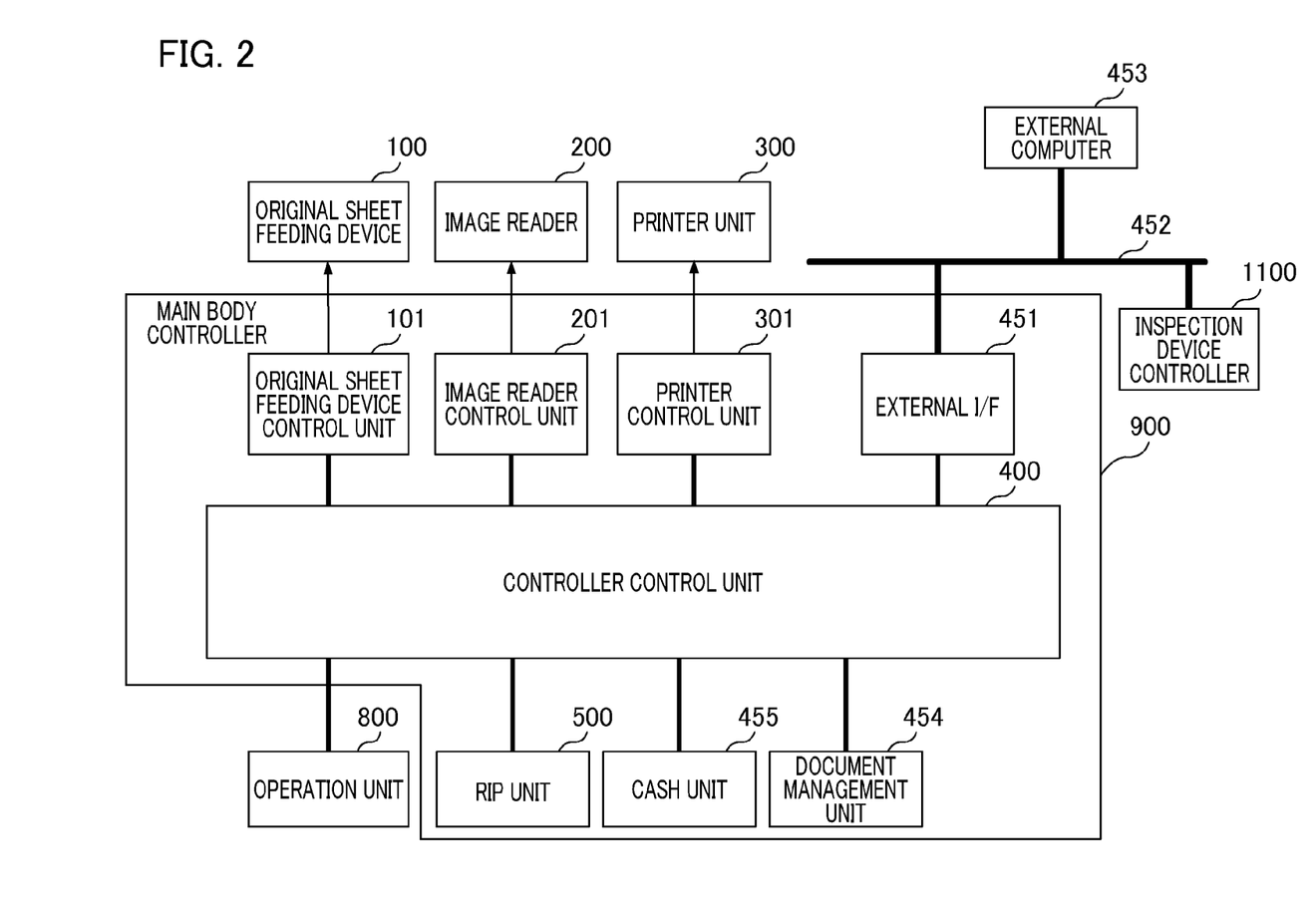
FIG. 2 is a diagram illustrating an example of the configuration of a main body controller.

The inspection device controller 1100 acquires image data from the document management unit 454 of the main body controller 900. The image data acquired from the document management unit 454 by the inspection device controller 1100 is referred to as "reference image data" in the following. Then, the inspection device controller 1100 compares reference image data with target image data.

The inspection device controller 1100 inspects the print output based on the comparison result between reference image data and target image data. More specifically, the inspection device controller 1100 determines whether a page included in the print output is a defective page (NG) or not (OK). Also, the inspection device controller 1100 feeds the print output into a finisher 600. The finisher 600 cuts the print output along the predetermined cut line and performs processing such as stapling, punching, or the like. With this arrangement, the print output is subject to bookbinding processing.

FIG. 2 is a diagram illustrating an example of the configuration of the main body controller. The main body controller 900 includes a controller control unit 400, an original sheet feeder control unit 101, an image reader control unit 201, a printer control unit 301, and an external I/F (Interface) 451. Also, the main body controller 900 includes an RIP (Raster Image Processor) unit 500, a document management unit 454, and a cache unit 455.

The controller control unit 400 controls the main body controller 900 overall. More specifically, the controller control unit 400 executes the following processing based on the settings made by an operation unit 800 according to a user operation or the instructions received from the external computer 453 via the external bus 452 and the external I/F 451. The controller control unit 400 communicates with an original sheet feeding deice control unit 101 and the image reader control unit 201 to thereby acquire image data of the input original sheet. The original sheet feeding deice control unit 101 controls the original sheet feeding deice 100 in accordance with an instruction given by the controller control unit 400. Also, the image reader control unit 201 controls the image reader 200 in accordance with an instruction given by the controller control unit 400.

Also, the controller control unit 400 functions as a job reception unit that receives a VDP job from the external computer 453 via the external I/F 451. In the present embodiment, when the controller control unit 400 receives a VDP job, the controller control unit 400 determines whether or not the cache unit 455 stores image data of a reusable object corresponding to a print job (VDP job).

When the cache unit 455 stores image data of a reusable object corresponding to a VDP job, the controller control unit 400 acquires image data of the reusable object stored in the cache unit 455. Also, the controller control unit 400 instructs the RIP unit 500 to generate image data of the variable object. The controller control unit 400 arranges image data of the generated variable object and image data of the reusable object acquired from the cache unit 455 on a page to thereby generate image data to be printed. The controller control unit 400 stores the generated image data to be printed in the document management unit 454. Examples of the document management unit 454 include a hard disk or the like. The readout speed of data from the document management unit 454 is slower than that from the cache unit 455.

Also, the controller control unit 400 executes the following processing when the cache unit 455 does not store image data of a reusable object corresponding to a VDP job. The controller control unit 400 instructs the RIP unit 500 to generate image data of a reusable object and image data of a variable object. More specifically, the RIP unit 500 generates a bitmap image of each of a reusable object and a variable object. The controller control unit 400 arranges image data of the generated variable object and image data of the generated reusable object on a page, and generates image data to be printed and stores it in the document management unit 454. Also, the controller control unit 400 stores a predetermined number of image data of the generated reusable object in the cache unit 455.

Also, the controller control unit 400 instructs the printer control unit 301 to print image data in the document management unit 454. In other words, the controller control unit 400 functions as a printing unit that arranges image data of a reusable object and image data of a variable object, which correspond to a print job, on a page for printout.

Also, the controller control unit 400 receives the inspection result from the comparing/determining control unit 1002 (see FIG. 5B) of the inspection device controller 1100 via the external I/F 451. Then, the controller control unit 400 functions as a control unit that executes control for preferentially storing image data of a reusable object corresponding to a page, for which the printing has been determined to be defective, in the cache unit 455 based on inspection result.

The cache unit 455 functions as an object storage unit that stores a predetermined number of image data of a reusable object. An example of the cache unit 455 is a high-speed accessible cache memory.

In the present embodiment, a weighted value is associated with each reusable object (each first object). A weighted value is a weighted value indicating priority relating to the storage of image data of a reusable object in the cache unit 455. Then, the controller control unit 400 preferentially stores a predetermined number of image data of a reusable object in the cache unit 455 in descending order of the weighted value. Also, the controller control unit 400 releases image data of a reusable object in excess of the predetermined number from the cache unit 455 in ascending order of the weighted value.

Also, the controller control unit 400 passes image data, which is stored in the document management unit 454, to the inspection device controller 1100 in response to a request from the inspection device controller 1100.

Figure 3A:
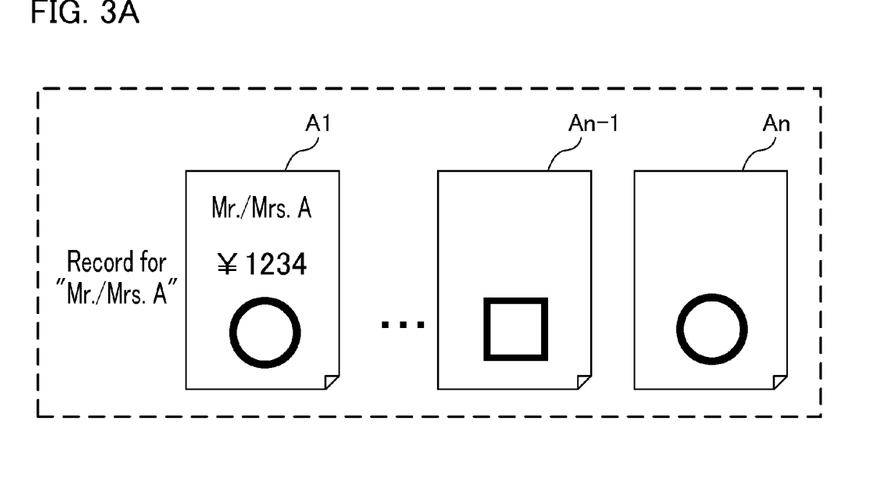
FIGS. 3A and 3B are diagrams illustrating an example of objects included in a VDP job.
Figure 3B:
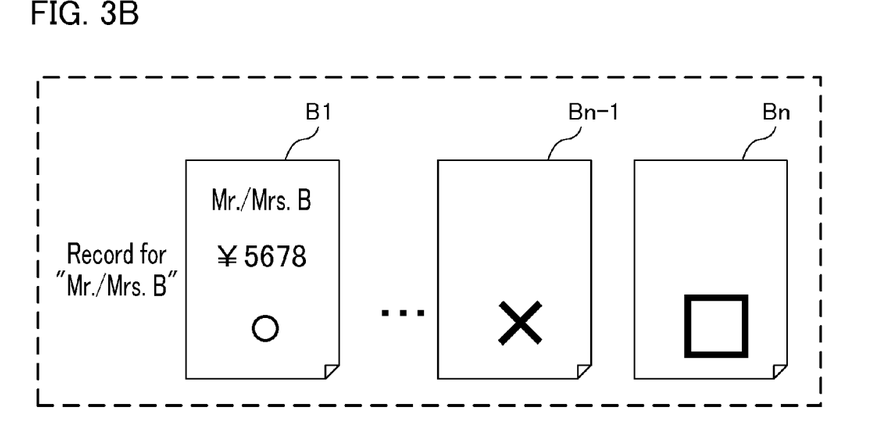

Each of FIGS. 3A and 3B is a diagram illustrating an example of objects included in a VDP job. FIG. 3A shows a record of a customer "A". FIG. 3B shows a record of a customer "B". In this example, a VDP job is a job for printing pages included in each record shown in FIGS. 3A and 3B. The record of "A" includes page A1 to page An. Also, the record for "Mr./Mrs. B" includes page B1 to page Bn.

Among objects included in each page shown in FIGS. 3A and 3B, for example, objects "Mr./Mrs. A" and "¥1234" included in page A1 and objects "Mr./Mrs. B" and "¥5678" included in page B1 are variable objects. On the other hand, objects indicated by "circle" included in pages A1, B1, and An, objects indicated by "square" included in pages An-1 and Bn, and an object indicated by "x-mark"included in page Bn-1 are reusable objects.

Figure 4A:
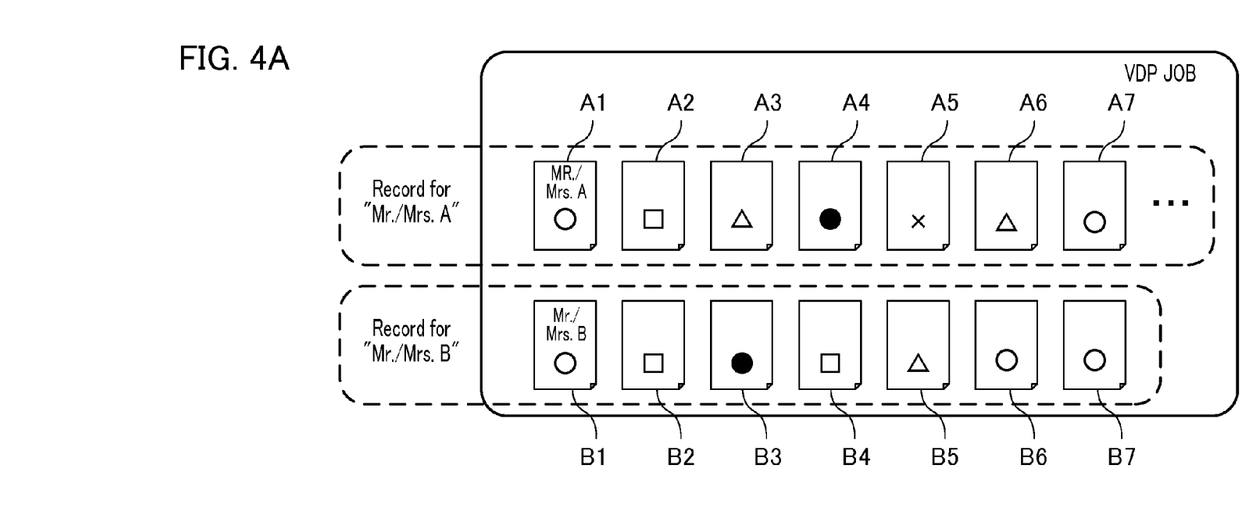
FIGS. 4A and 4B are diagrams illustrating storage in a cache unit depending on the weighted value of a reusable object.
Figure 4B:
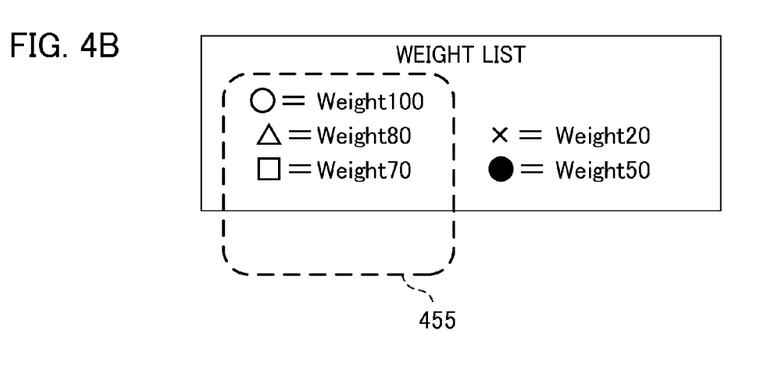

Each of FIGS. 4A and 4B is a diagram illustrating storage in a cache unit depending on the weighted value of a reusable object. FIG. 4A shows an example of print data corresponding to a VDP job and a reusable object(s) included in the print data. The VDP job shown in FIG. 4A includes the record for "Mr./Mrs. A" and the record for "Mr./Mrs. B". Pages A1, A2, A3, A4, A5, A6, A7, . . . are pages included in the record for "Mr./Mrs. A". Pages B1, B2, B3, B4, B5, B6, and B7 are pages included in the record for "Mr./Mrs. B". The reusable objects included in the VDP job are indicated by a circle, a square, a triangle, a black circle, or an x-mark.

FIG. 4B shows the list (hereinafter referred to as "weight list") of the weighted values of the reusable objects included in print data corresponding to the VDP job shown in FIG. 4A. The controller control unit 400 brings the reusable objects into association with the weighted values based on, for example, the number of occurrences, the proportion of occurrences, or the like of the reusable objects in a VDP job to thereby generate a weight list. The controller control unit 400 stores the generated weight list in a predetermined storage unit. Then, the controller control unit 400 preferentially stores image data of a reusable object in the cache unit 455 in descending order of the weighted value. In this example, the weighted value of a reusable object indicated by "circle" is 100, the weighted value of a reusable object indicated by "triangle"is 80, and the weighted value of a reusable object indicated by "square" is 70. Also, the weighted value of a reusable object indicated by "x-mark" is 20, and the weighted value of a reusable object indicated by "black circle" is 50.

Assuming that the cache unit 455 stores image data of three reusable objects in descending order of the weighted value, the controller control unit 400 stores image data of three reusable objects indicated by "circle", "triangle", and "square" in the cache unit 455.

Figure 5A:
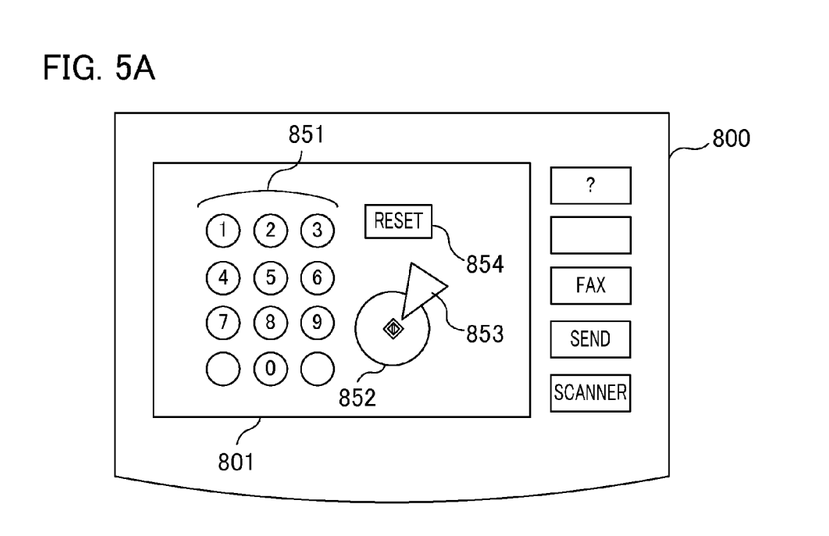
FIG. 5A is a diagram illustrating an example of the configuration of an operation unit included in an image forming apparatus.

FIG. 5A is a diagram illustrating an example of the configuration of the operation unit 800 included in an image forming apparatus. The operation unit 800 includes an LCD display unit 801. The LCD display unit 801 has the configuration in which a touch panel sheet is affixed on an LCD. The LCD display unit 801 displays the operation screen for a system. A ten key 851, a start key 852, a stop key 853, and a reset key 854 are displayed on the operation screen.

When any of the keys displayed on the operation screen is pressed, the LCD display unit 801 conveys positional information about the key to the controller control unit 400. With this arrangement, information corresponding to the pressed key is input to the controller control unit 400. The ten key 851 is a key for inputting information such as the number of copies or the like. The start key 852 is a key for inputting control information for ordering an image forming apparatus to start of a copying operation or an original sheet readout operation. The stop key 853 is a key for inputting control information for ordering the stop of the operation during operation. The reset key 854 is a key for inputting control information for ordering the start of reset.

Figure 5B:
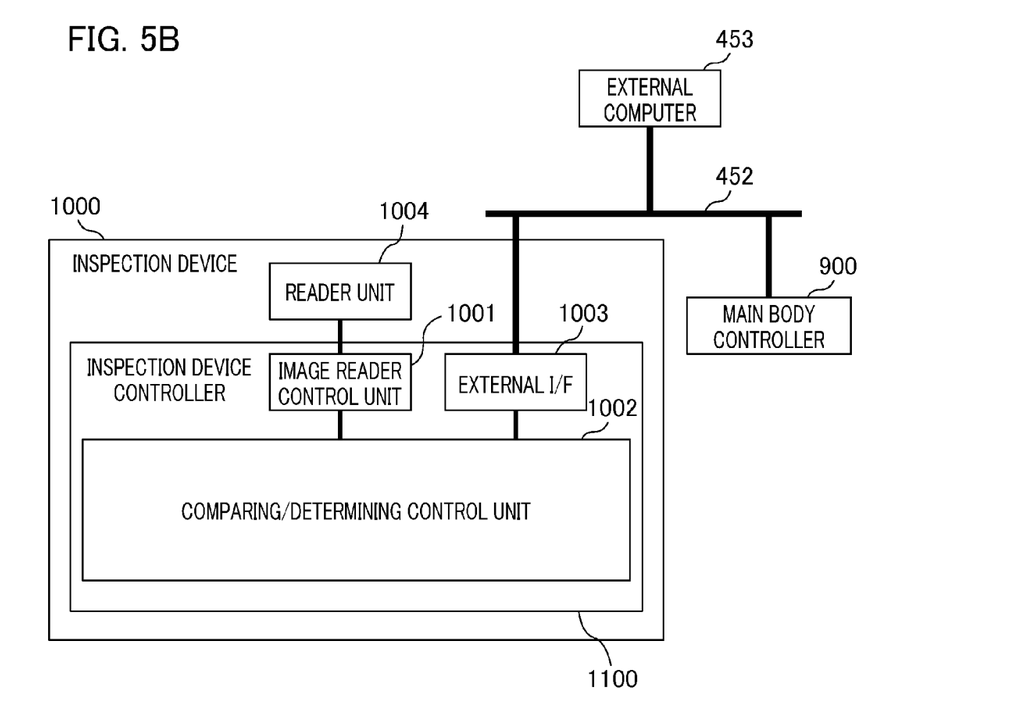
FIG. 5B is a diagram illustrating an example of the configuration of an inspection device.

FIG. 5B is a diagram illustrating an example of the configuration of an inspection device. The inspection device 1000 includes an image reader control unit 1001, a comparing/determining control unit 1002, an external I/F 1003, and a reader unit 1004. The image reader control unit 1001, the comparing/determining control unit 1002, and the external I/F 1003 correspond to the inspection device controller 1100. The reader unit 1004 is the same as the reader unit 1004 shown in FIG. 1.

The image reader control unit 1001 controls the reader unit 1004 to thereby read out image data of the print output. The read-out image data is target image data. The external I/F 1003 mediates communication between the external computer 453 and the inspection device 1000 and communication between the main body controller 900 and the inspection device 1000. The comparing/determining control unit 1002 acquires target image data from the image reader control unit 1001.

Also, the comparing/determining control unit 1002 acquires reference image data from the main body controller 900 via the external I/F 1003. Then, the comparing/determining control unit 1002 functions as a determination unit that compares target image data with reference image data and determines whether or not a page(s) included in the print output is a defective page, i.e., whether or not printing is defective for each page, based on the comparison result. The determination result is referred to as the "inspection result" in the following. The comparing/determining control unit 1002 passes the inspection result to the controller control unit 400 of the main body controller 900.

Figure 6A:
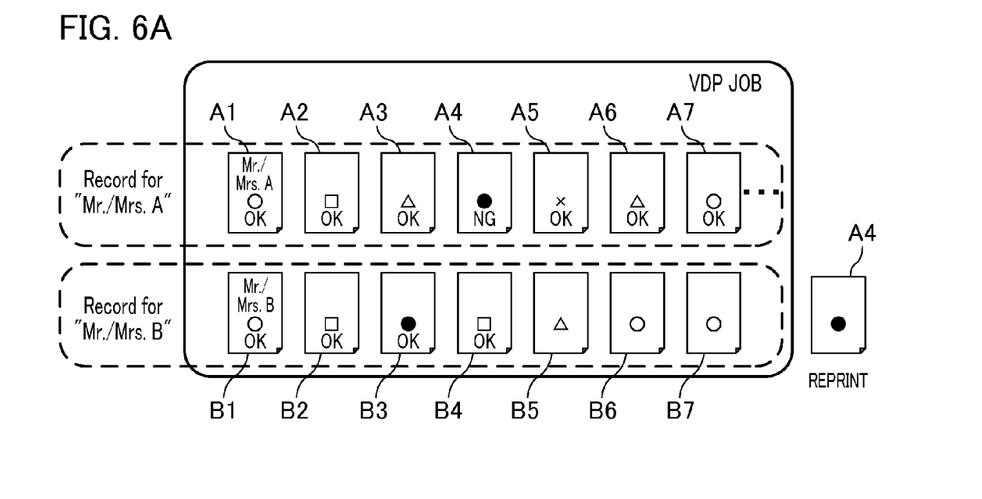
FIGS. 6A to 6C are diagrams illustrating the change in the weighted value of a reusable object.
Figure 6B:
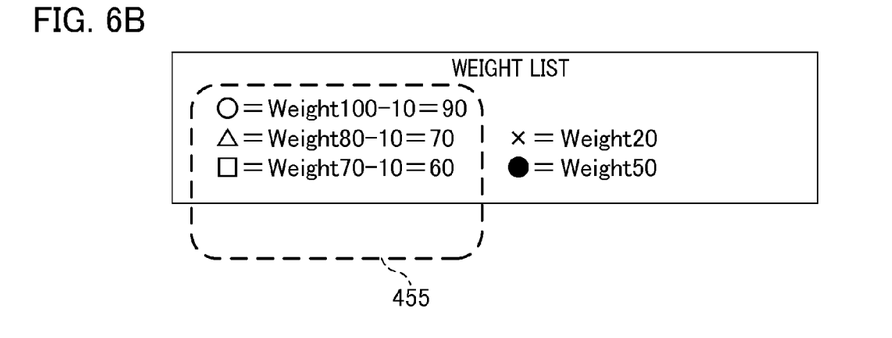
Figure 6C:
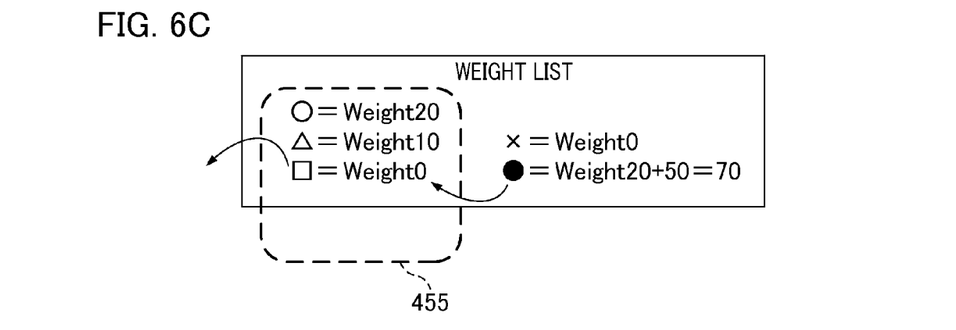

Each of FIGS. 6A to 6C is a diagram illustrating the change in the weighted value of a reusable object according to the first embodiment. The symbols A1 to A7 and B1 to B7 shown in FIG. 6A are pages included in a VDP job. In FIG. 6A, the pages on which the character "OK"is specified are (OK-determined) pages for which the inspection device controller 1100 has determined that printing is not defective, and the pages on which the character "NG" is specified are (NG-determined) pages for which the inspection device controller 1100 has determined that printing is defective. In the following, the OK-determined page is referred to as an "OK page". Also, the NG-determined page is referred to as an "NG page".

The controller control unit 400 acquires the inspection result for each page from the inspection device controller 1100. The controller control unit 400 lowers the weighted value of the reusable object included in a page each time the OK page occurs. For example, the controller control unit 400 reduces by ten the weighted value of the reusable object included in the OK page. Of course, the controller control unit 400 may reduce the weighted value of the reusable object included in the OK page by any value.

Also, when the weighted value of any one of the reusable objects of image data stored in the cache unit 455 becomes zero, the controller control unit 400 increases the weighted value of the reusable object included in the NG page. For example, the controller control unit 400 adds 50 to the weighted value of the reusable object included in the NG page. When the weighted value of any one of the reusable objects is any value (first value), the controller control unit 400 may also set the weighted value of the reusable object included in the NG page to any value (second value) greater than the first value.

FIG. 6B is a diagram illustrating the change in the weighted values of reusable objects when it is determined that the pages A1 to A3 of the record for "Mr./Mrs. A" are "OK". Page A1 includes a reusable object indicated by "circle". Page A2 includes a reusable object indicated by "square". Also, page A3 includes a reusable object indicated by "triangle". Thus, when it is determined that the pages Al to A3 are "OK", the controller control unit 400 changes the weighted values of the reusable objects indicated by "circle", "triangle", and "square" to the values that lower than the weighted values thereof by an amount of ten, among the reusable objects included in the weight list as shown in FIG. 6B.

FIG. 6C shows the weighted values of the reusable objects when the pages B1 to B4 of the record for "Mr./Mrs. B" has been subject to inspection processing subsequent to inspection processing for pages included in the record for "Mr./Mrs. A". At this point, the weighted value of the reusable object indicated by "square" becomes zero. Here, it has already been determined that page A4 is NG as shown in FIG. 6A.

The controller control unit 400 changes the weighted value of the reusable object indicated by "black circle" included in page A4 to values that exceed the weighted value thereof by an amount of 50 as shown in FIG. 6C. With this arrangement, the reusable object having the highest weighted value is a reusable object indicated by "black circle". The reusable object having the second highest weighted value is a reusable object indicated by "circle". Also, the reusable object having the third highest weighted value is a reusable object indicated by "triangle". Thus, the controller control unit 400 releases image data of a reusable object indicated by "square" of which the weighted value becomes zero from the cache unit 455. Note that the controller control unit 400 may also release a reusable object, of which the weighted value has been decreased to a predetermined arbitrary value, from the cache unit 455.

An opening occurs in the cache unit 455 by releasing image data of a reusable object indicated by "square" from the cache unit 455. The controller control unit 400 stores a reusable object indicated by "black circle" in the cache unit 455. With this arrangement, the controller control unit 400 may employ image data of a reusable object indicated by "black circle", which is stored in the cache unit 455, when NG page A4 is reprinted.

More specifically, when NG page A4 is reprinted, the controller control unit 400 generates image data of a variable object corresponding to NG page A4, and acquires image data of a reusable object indicated by "black circle" from the cache unit 455. Note that the controller control unit 400 may acquire image data of a variable object corresponding to an NG page from the image data stored in the document management unit 454. Then, the controller control unit 400 arranges image data of the generated/acquired variable object and image data of the acquired reusable object indicated by "black circle" on page A1 to thereby generate image data to be printed. Thus, the controller control unit 400 is capable of executing reprint processing using image data of the reusable object acquired from the cache unit 455 without generating image data of a reusable object. Consequently, the efficiency of NG page reprint processing is improved.

Figure 7:
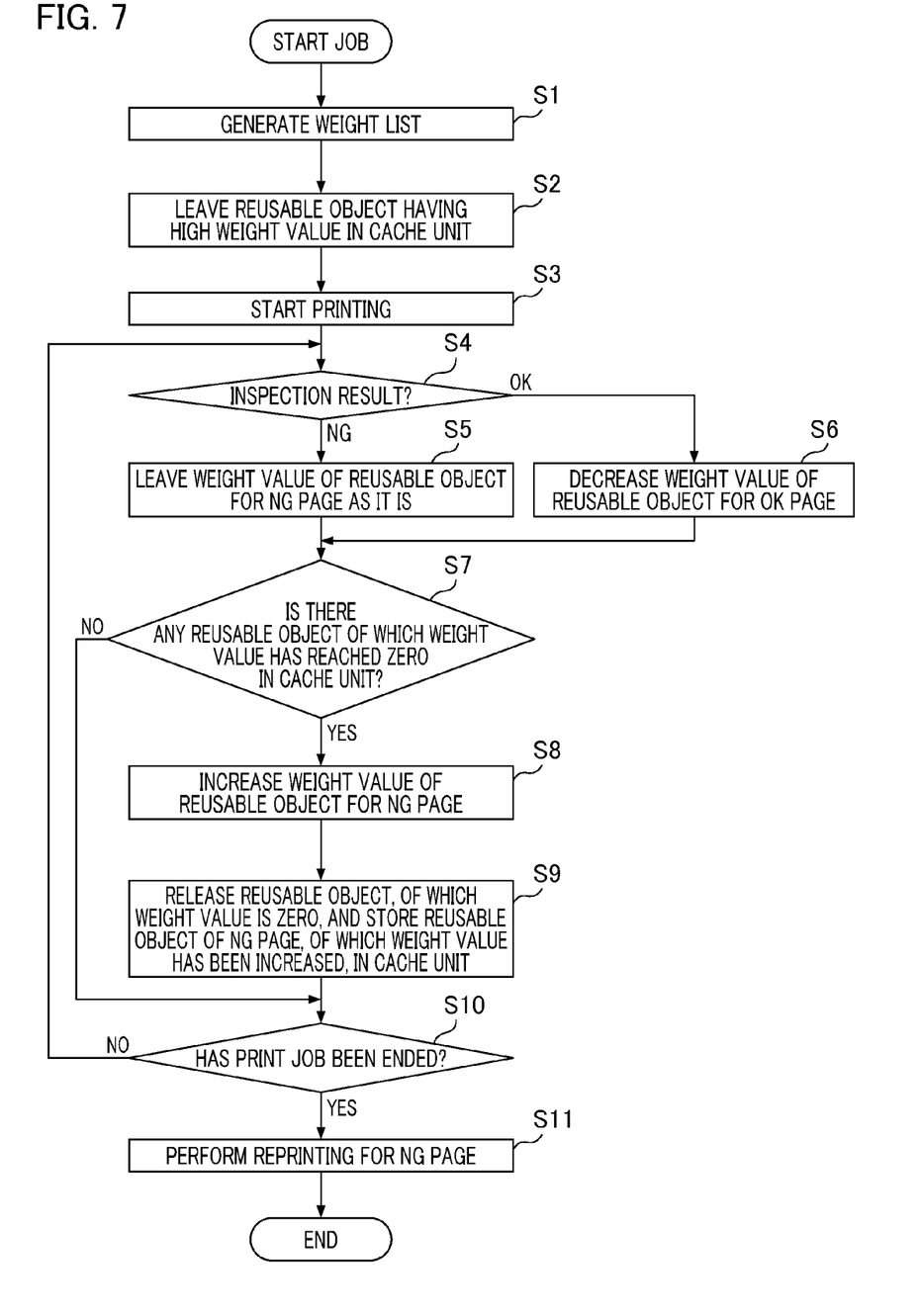
FIG. 7 is a flowchart illustrating reprint processing for an NG page.

FIG. 7 is a flowchart illustrating NG page reprint processing according to the first embodiment. Firstly, the controller control unit 400 generates a weight list (step S1). The controller control unit 400 refers to the weight list, and preferentially leaves the reusable objects having a high weighted value in the cache unit 455 (step S2).

Next, the controller control unit 400 starts printing in response to a print job (step S3). The inspection device controller 1100 performs inspection processing for the print output for each page. The controller control unit 400 determines whether or not each page is an OK page or an NG page based on the inspection result acquired from the inspection device controller 1100 (step S4).

When a page is an OK page, the controller control unit 400 decreases the weighted value of the reusable object included in the OK page in the weight list (step S6), and the process advances to step S7. In step S6, for example, the controller control unit 400 decreases the weighted value of the reusable object included in the OK page by an amount of 10. When a page is an NG page, the controller control unit 400 leaves the weighted value of the reusable object included in the NG page as it is in the weight list (step S5).

Next, the controller control unit 400 determines whether or not there is any reusable object of which the weighted value has reached zero in the cache unit 455 (step S7). When there is no reusable object of which the weighted value has reached zero in the cache unit 455, the process advances to step S10. When there is a reusable object of which the weighted value has reached zero in the cache unit 455, the process advances to step S8.

In step S8, the controller control unit 400 increases the weighted value of the reusable object included in the NG page in the weight list (step S8). For example, the controller control unit 400 increases the weighted value of the reusable object included in the NG page by an amount of 50.

Next, the controller control unit 400 releases the reusable object, of which the weighted value has been decreased to zero, from the cache unit 455, and stores the reusable object, of which the weighted value has been increased in step S8, in the cache unit 455 (step S9).

Next, the controller control unit 400 determines whether or not execution of a print job has been ended (step S10). When execution of a print job has not been ended, the process returns to step S4. When execution of a print job has been ended, the controller control unit 400 performs reprinting of an NG page (step S11). More specifically, the controller control unit 400 acquires image data of a reusable object corresponding to the NG page from the cache unit 455, and reprints the NG page using the acquired reusable object. Since the image forming apparatus of first embodiment acquires image data of a reusable object corresponding to the NG page from the cache unit 455 and performs print processing using the acquired image data, the NG page may be subject to print processing in a quick manner.

According to the image forming apparatus of the first embodiment described above, the efficiency of reprint processing for a defective page(s) that has occurred during execution of variable printing may be improved.

Figure 8A:
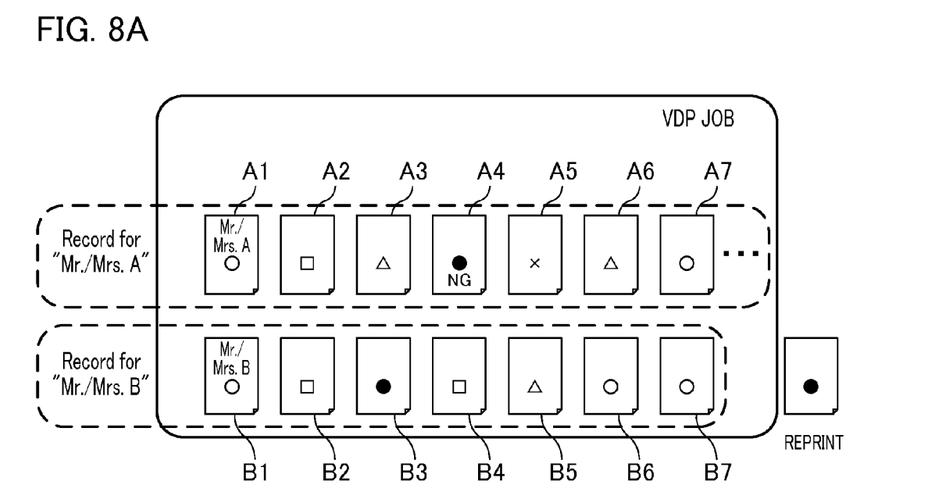
FIGS. 8A to 8C are diagrams illustrating the change in the weighted value of a reusable object.
Figure 8B:
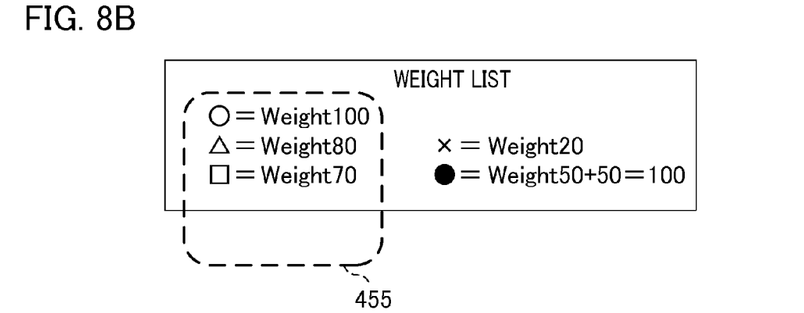
Figure 8C:
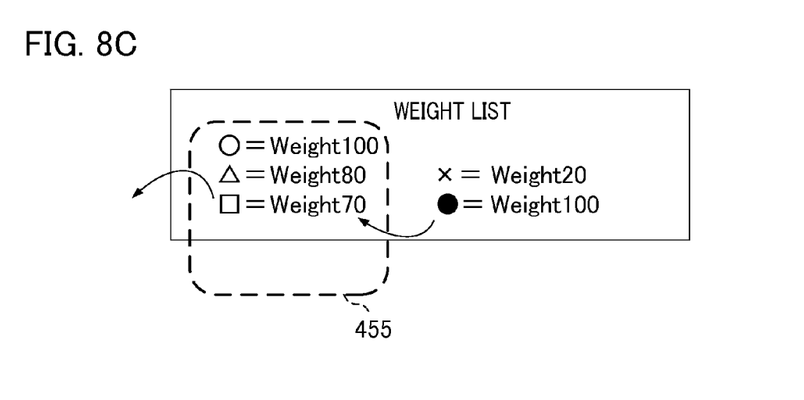

Each of FIGS. 8A to 8C is a diagram illustrating the change in the weighted value of a reusable object according to a second embodiment. In this example, it is assumed that a capacity of reusable objects to be stored in the cache unit 455 is three reusable objects. In the second embodiment, upon completion of the execution of a VDP job, the controller control unit 400 sets the weighted value of the NG page to a value higher than the weighted value corresponding to any one of the reusable objects of which image data is stored in the cache unit 455. For example, among the reusable objects of which image data is stored in the cache unit 455, the controller control unit 400 sets the weighted value of the NG page to a value higher than the weighted value of the reusable object having the lowest weighted value.

Pages A1 to A7 and pages B1 to B7 shown in FIG. 8A are pages included in a VDP job. In FIG. 8A, page (A4) on which "NG" is specified is an NG page. The controller control unit 400 acquires the inspection result for each page from the inspection device controller 1100. The controller control unit 400 performs the following processing upon completion of the execution of a VDP job, i.e., upon completion of printing to page B7 shown in FIG. 8A.

The controller control unit 400 sets the weighted value of the reusable object included in NG page A4 to a value higher than the weighted value of the reusable object having the lowest weighted value among the reusable objects of which image data is stored in the cache unit 455.

Here, the reusable object included in page A4 is a reusable object indicated by "black circle". Also, as shown in FIG. 8B, among the reusable objects of which image data is stored in the cache unit 455, the reusable object having the lowest weighted value is a reusable object indicated by "square". Also, the weighted value of the reusable object indicated by "square" is 70. Thus, the controller control unit 400 increases the weighted value of the reusable object indicated by "black circle" by an amount of, for example, 50 such that the weighted value becomes greater than 70. Any value may be added to the weighted value of the reusable object included in the NG page by the controller control unit 400.

Then, as shown in FIG. 8C, the controller control unit 400 releases image data of the reusable object indicated by "square" having the lowest weighted value from the cache unit 455, and stores image data of the reusable object indicated by "black circle" in the cache unit 455. Consequently, image data to be stored in the cache unit 455 is image data of reusable objects indicated by "circle", "triangle", and "black circle". In other words, the controller control unit 400 determines image data of reusable objects stored in the cache unit 455 based on the inspection result for each page. Note that, upon completion of the execution of a VDP job, the controller control unit 400 may release all of image data of reusable objects stored in the cache unit 455.

When NG page A4 is subject to reprinting, the controller control unit 400 may employ image data of the reusable object indicated by "black circle" stored in the cache unit 455. Thus, the controller control unit 400 is capable of printing image data of the reusable object without generating it again, and thus, the efficiency of reprint processing is improved.

Figure 9:
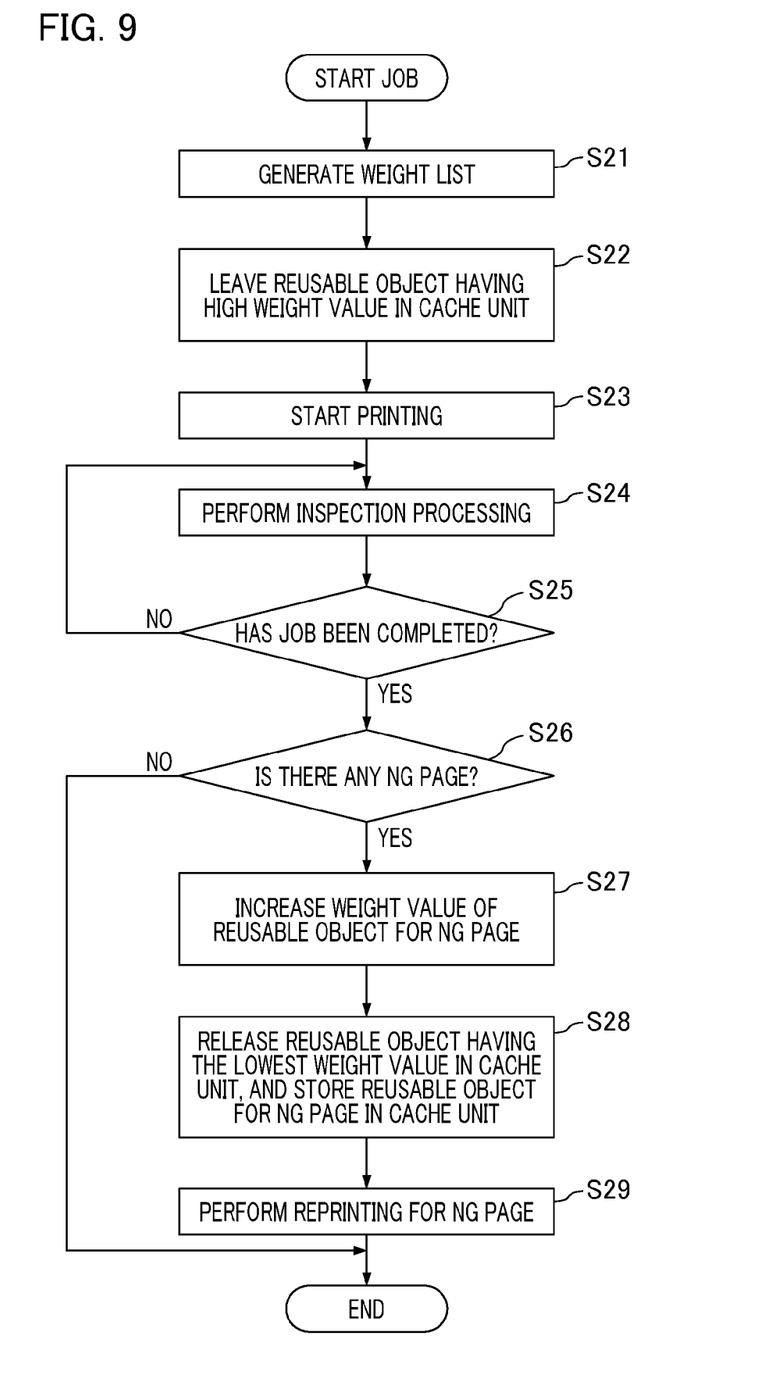
FIG. 9 is a flowchart illustrating reprint processing for an NG page.

FIG. 9 is a flowchart illustrating reprint processing for an NG page according to a second embodiment. Steps S21 to S23 shown in FIG. 9 are the same as steps S1 to S3 shown in FIG. 7. In step S24 shown in FIG. 9, the inspection device controller 1100 performs inspection processing for the print output for each page (step S24). Next, the controller control unit 400 determines whether or not a VDP job has been completed (step S25). When the VDP job has not been completed, the process returns to step S24. When the VDP job has been completed, the process advances to step S26.

Next, the controller control unit 400 determines whether or not there is any NG page based on the inspection result received from the inspection device controller 1100 (step S26). When there is no NG page, the process is ended. When there is an NG page, the process advances to step S27.

In step S27, the controller control unit 400 increases the weighted value of the reusable object included in the NG page (step S27). In other words, the controller control unit 400 sets the weighted value of the reusable object included in the NG page to a value higher than the weighted value of the reusable object having the lowest weighted value among the reusable objects of which image data is stored in the cache unit 455.

The controller control unit 400 releases image data of the reusable object having the lowest weighted value from the cache unit 455, and stores image data of the reusable object included in the NG page in the cache unit 455 (step S28). Then, the controller control unit 400 acquires image data of the reusable object included in the NG page from the cache unit 455, and reprints the NG page using image data of the acquired reusable object (step S29). Since the image forming apparatus of the second embodiment acquires image data of a reusable object corresponding to an NG page and performs print processing using the acquired image data, the NG page is capable of being subject to print processing in a quick manner. Also, the image forming apparatus of the second embodiment executes processing for increasing the weighted value of the reusable object included in the NG page upon completion of printing. Thus, as compared to the case where the weighted values of the reusable objects in the weight list are changed each time the inspection result for each page is output, a load on processing for storing image data of a reusable object included in an NG page in the cache unit 455 may be reduced.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims he benefit of Japanese Patent Application No. 2010-289843 filed Dec. 27, 2010, which is hereby incorporated by reference herein in its entirety.

What is claimed is:

1. An image forming apparatus that executes a print job including a first object which is shared among a plurality of pages and a second object which is variable for each page, the image forming apparatus comprising:

an object storage unit configured to store a predetermined number of image data of the first object;

a job reception unit configured to receive the print job;

a printing unit configured to arrange and print image data of the first and the second objects on a page;

a reading unit configured to read an image of printed matter obtained by the printing;

a determination unit configured to determine whether or not the printing is defective for each page based on a comparison result between an image of the read printed matter and a reference image; and a control unit configured to execute control for preferentially storing image data of the first object corresponding to a page, for which the printing has been determined to be defective, based on a determination result indicating whether or not the printing is defective by the determination unit, wherein, the printing unit acquires image data of the first object from the object storage unit and arranges the image data on the page when the object storage unit stores image data of the first object included in the received print job, and generates image data of the first object and arranges the image data on the page when the object storage unit does not store image data of the first object included in the received print job.

2. The image forming apparatus according to claim 1, wherein a weighted value indicating a priority for storage of image data in the object storage unit is associated with each the first object, and wherein the control unit stores the number of image data of the first object in the object storage unit in descending order of the weighted value, releases image data of the first object in excess of the number from the object storage unit, and sets the weighted value of the first object, which corresponds to the page for which the printing has been determined to be defective, to a value higher than any one of the weighted values of the first object of which image data is stored in the object storage unit.

3. The image forming apparatus according to claim 2, wherein the control unit decreases the weighted value of the first object, which corresponds to the page for which the printing has been determined not to be defective, after each time the printing has been determined to be defective, and increases the weighted value of the first object, which corresponds to the page for which the printing has been determined not to be defective, when any one of the weighted values of the first object of which image data is stored in the object storage unit becomes zero.

4. The image forming apparatus according to claim 2, wherein, when the printing is ended, the control unit sets the weighted value of the first object, which corresponds to the page for which the printing has been determined to be defective, to a value higher than the weighted value of the first object having the lowest weighted value among the first objects of which image data is stored in the object storage unit.

5. A method for controlling an image forming apparatus that executes a print job including a first object which is shared among a plurality of pages and a second object which is variable for each page, wherein the image forming apparatus comprises an object storage unit configured to store a predetermined number of image data of the first object, the method comprising:

receiving, in a job reception step, the print job; arranging and printing, in a printing step, image data of the first and the second objects on a page;

reading, in a reading step, an image of printed matter obtained by the printing;

determining, in a determination step, whether or not the printing is defective for each page based on a comparison result between an image of the read printed matter and a reference image; and executing, in a control step, control for preferentially storing image data of the first object corresponding to a page, for which the printing has been determined to be defective, based on a determination result indicating whether or not the printing is defective in the determination step, wherein, in the printing step, image data of the first object from the object storage unit is acquired and the image data is arranged on the page when the object storage unit stores image data of the first object included in the received print job, and image data of the first object is generated and the image data is arranged on the page when the object storage unit does not store image data of the first object included in the received print job.

6. A non-transitory computer readable storage medium storing computer-executable code of a program to cause a computer to execute a method for controlling an image forming apparatus that executes a print job including a first object that is shared among a plurality of pages and a second object that is variable for each page, wherein the image forming apparatus comprises an object storage unit configured to store a predetermined number of image data of the first object, the method comprising:

receiving, in a job reception step, the print job; arranging and printing, in a printing step, image data of the first and the second objects on a page;

reading, in a reading step, an image of printed matter obtained by the printing;

determining, in a determination step, whether or not the printing is defective for each page based on a comparison result between an image of the read printed matter and a reference image; and executing, in a control step, control for preferentially storing image data of the first object corresponding to a page, for which the printing has been determined to be defective, based on a determination result indicating whether or not the printing is defective in the determination step, wherein, in the printing step, image data of the first object from the object storage unit is acquired and the image data is arranged on the page when the object storage unit stores image data of the first object included in the received print job, and image data of the first object is generated and the image data is arranged on the page when the object storage unit does not store image data of the first object included in the received print job.

* * * * *